INVENTORS
ROLF AUGUST DAHLBLOM
BERNHARD LILLSUNDE
BY Hane and Nydick
ATTORNEYS

INVENTORS
ROLF AUGUST DAHLBLOM
BERNHARD LILLSUNDE
BY Hane and Nydick
ATTORNEYS

Dec. 7, 1965 R. A. DAHLBLOM ET AL 3,222,458

AUTOMATIC TELEPHONE EXCHANGE

Filed May 16, 1960 5 Sheets-Sheet 3

INVENTORS
ROLF AUGUST DAHLBLOM
BERNHARD LILL SUNDE
BY Hane and Nydick
ATTORNEYS

INVENTORS
ROLF AUGUST DAHLBLOM
BERNHARD LILLSUNDE
BY Hane and Nydick
ATTORNEYS

Dec. 7, 1965 R. A. DAHLBLOM ET AL 3,222,458

AUTOMATIC TELEPHONE EXCHANGE

Filed May 16, 1960 5 Sheets-Sheet 5

INVENTORS
RUDOLF AUGUST DAHLBLOM
BERNHARD LILLSUNDE

BY Hane and Nydick
ATTORNEYS 3,222,458
Patented Dec. 7, 1965

3,222,458

AUTOMATIC TELEPHONE EXCHANGE

Rolf August Dahlblom and Bernhard Lillsunde, Hagersten, Sweden, assignors to Telefonaktiebolaget L M Ericsson, Stockholm, Sweden, a corporation of Sweden Filed May 16, 1960, Ser. No. 29,539
Claims priority, application Sweden, May 15, 1959, 4,679/59
4 Claims. (Cl. 179—18)

Figure 1:
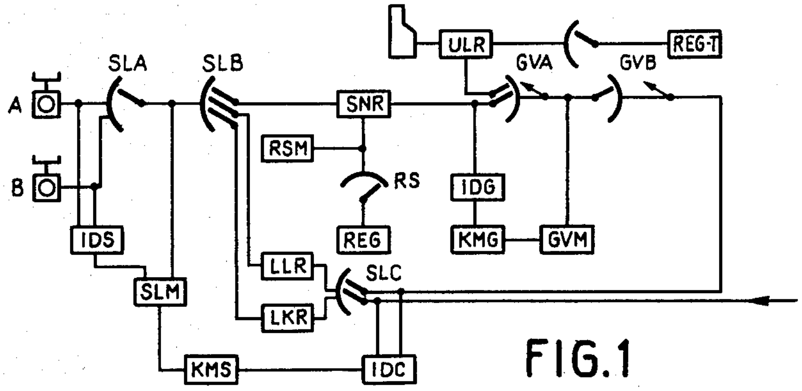

The present invention relates to a telephone exchange which comprises a number of selecting stages and in which exchange an incoming line is connected to a called subscriber through a connecting relay set and through idle selecting stages by means of a marker, to carry out a selection among a number of connecting relay sets of different types in dependence on the condition of the called subscriber line (for example free-, busy-, blocked et cetera). If a called subscriber is busy and an operator wants to break into the connection, relatively expensive equipment is necessary in the connecting relay set in order to carry out the necessary functions. Said equipment is unnecessary in the case the subscriber is idle and the connection can be set up directly. In such traffic where an operator does not have to perform steps, that is, in so-called subscriber controlled traffic, said equipment is normally unnecessary but if is required that a calling subscriber immediately upon completion of a call should come into contact with the subscriber who was busy before, such an equipment is needed. Thus it would be suitable to provide the telephone exchange with said expensive equipment only to such extent as it is really motivated by the traffic. It is also further necessary that the control desk can cut in for example on a blocked subscriber in order to carry out controlling measurements. Also in this case expensive devices are necessary.

Until now said problems have been solved by using special operator routes and controlling routes respectively with expensive equipments belonging to them, and for the subscriber controlled traffic other routes with a cheaper equipment have been used. Th drawback with said system is that it necessitates an operator signal or control desk signal in forward direction to all the selector stages cooperating in the connection. This implies in operator traffic that the expensive equipments will be used in all operator controlled traffic also to idle subscribers. Furthermore it is in certain telephone systems impossible to send an operator signal or control desk signal in forward direction.

It is also possible that operators or control desks respectively have own lines directly to the expensive connecting relay sets, but also in such case all operator traffic will go through the expensive equipment also to idle subscribers. In the case of a control desk this implies that the lines are not sufficiently utilized. It is also known to carry out operator traffic through cheap connecting relay sets, if the subscriber is idle, and the more complicated relay sets will be used only if the subscriber is busy, either for interrupting the connection or only for calling the attention of the speaking subscriber. Said system has the drawback that it necessitates signalling in forward direction or separate operator lines.

The object of the present invention is to eliminate said drawbacks and to provide a telephone system, in which it is possible in response to an incoming call, to select between usual direct connecting relay sets or join-in relay sets respectively depending upon whether the called subscriber is idle, busy or is blocked, but independently of the fact whether the call comes from an operator or a subscriber, in order to decrease hereby as much as possible the number of such connecting relay sets, the cost of which considerably exceeds the expenses for usual direct relay sets.

The circuit arrangement according to the invention is mainly characterized by the fact that each incoming line is connected to the input of a selector (bridge) in an incoming stage and that the relay sets are connected to selector-(bridge-) inputs in an intermediate stage, the marker comprising means to carry out a test concerning the condition of the called subscriber line, and means to select in dependence on the test result among relay sets of different type and to set up a connecting path between the incoming line and the line equipment of the called subscriber through an idle selector (bridge) in the intermediate stage, to the input of which a connecting relay set of the type corresponding to the condition of the subscriber line (idle-, busy-, blocked- and so on) is connected.

Figure 2:
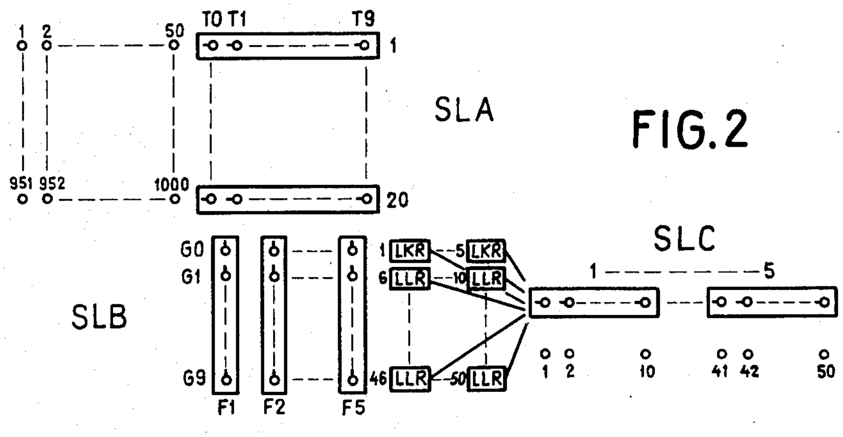
Figure 3:
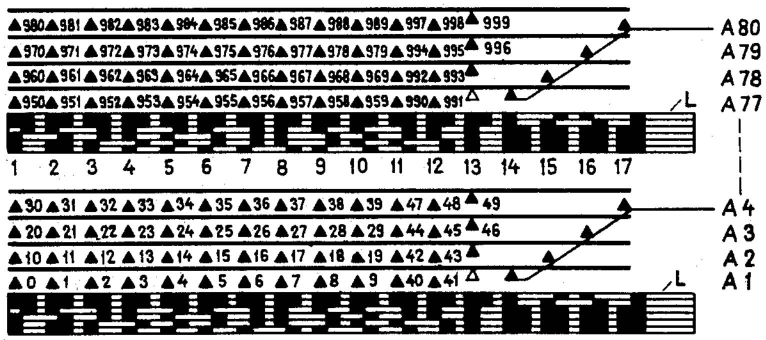
Figure 4:
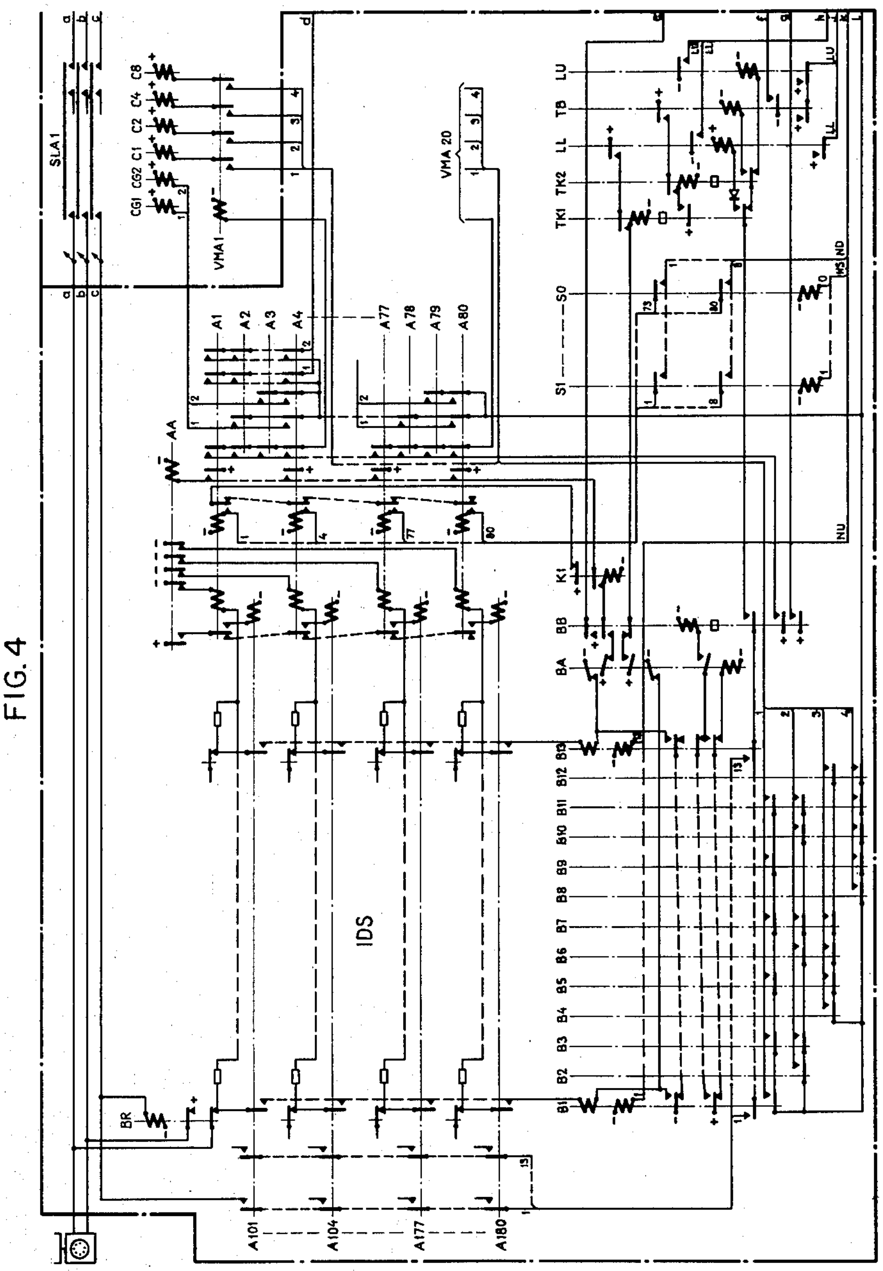

The invention will be described more in detail by means of an embodiment with reference to the enclosed drawing, in which FIG. 1 shows an automatic telephone system as a block diagram, FIG. 2 shows the grouping of the bridges in the SLA-, SLB- and SLC-stages, FIG. 3 shows the arrangement of the contacts in the bridges, and FIGS. 4–7 show a circuit diagram more in detail of a telephone system to which the principle of the invention has been applied in operator traffic.

FIG. 1 shows a diagram of a telephone exchange comprising selectors of a suitable type which together can form a number of links or substages between an input and an output. When calling, a subscriber A is connected to the identifier IDS in the marker SLM and the subscriber is identified. Through idle selector stages SLA and SLB the marker connects the subscriber to an idle connecting relay set SNR and through the latter and through a register finder RS to an idle register REG which after receiving the digits calls the identifier IDG in the following selector stage GV. Identifier IDG identifies the input and connects it to the code receiver KMG which receives the necessary digit information and connects the GVM-marker to the connection. Marker sets up an idle path by means of such digit information and calls the identifier IDC of the SLC-stage. Identifier IDC identifies the input and connects the code receiver KMS to relay set SNR. Receiver KMS receives a suitable number of digits from the register and calls the SLM-marker which determines whether the subscriber is idle or busy and selects a connecting relay set LKR or LLR respectively corresponding to the idle or busy condition of the subscriber and sets up an idle connecting path from the input of the SLC-stage through the selected connecting relay set LKR or LLR respectively and through the SLB- and SLA-stage to the called subscriber. When calling from subscriber to subscriber there will be no difference in function from the case when only one type of connecting relay sets is found notwithstanding the fact that when finding idle condition the LLR-relay sets are connected up and when finding busy condition the LKR-relay sets are connected up. However, when calling from an operator the latter can cut into a conversation in progress in the case the subscriber is busy and consequently the LKR-relay set has been operated.

FIG. 2 shows diagrammatically an illustrative example of the grouping of the bridges and of the connecting relay sets when applying the principle of the invention to a telephone exchange consisting of code relay selectors. The structure of the code relay selector has been described in Patent 3,060,274. The telephone exchange according to the embodiment is intended for connecting 50 incoming lines to 1000 subscribers. The incoming lines are permanently connected with the input of 50 SLC-bridges belonging to five SLC-selectors. The SLC-bridges have 50 outputs each and all the 50 bridges of the five SLC-selectors are multiplied so that they have access to the inputs of 50 SLB-bridges through connecting relay sets LLR or LKR respectively connected permanently to the inputs of said bridges. The SLB-bridges, which are located in five selectors, have each 40 outputs and are multiplied in such manner that the bridges which are located in the same selector have access to 40 definite SLA-bridges. The 1000 subscribers are connected to 20 SLA-selectors, each comprising 10 bridges, which are multiplied to the same 50 subscribers. As appears from the symbolic representation, an SLB-bridge belonging to a definite SLB-selector can reach the inputs of those SLA-bridges which are located in two vertical rows, each cooperating with the respective SLB-selector, each SLA-bridge row comprising 20 bridges.

FIG. 3 shows diagrammatically the grouping of the contacts on the code relay selector bridges in the first and the twentieth selector in the SLA-stage. The code relay selector according to the embodiment has 12 horizontal and 17 vertical contact rows and 12 contact bars with which the contacts belonging to the same horizontal row can be brought into contact. 13 vertical rows comprise 50 (theoretically 52) 3-pole outputs while the 3-pole input is connected to a 3-pole contact group in each of the rows 14–17, so that by operating one of the vertical rows 1–13 and one of the vertical rows 14–17 the input can be fed to one of the 50 outputs as it is easy to understand. The three contacts belonging together are indicated by a single contact symbol for the sake of simplicity. As a horizontal row comprises 12 or 13 contact groups respectively, the subscribers are numbered in such a manner that the first 10 contact groups of the four horizontal rows are numbered from 0 to 39 while the last two contact groups in the horizontal rows 1 and 2 and the last three contact groups in the horizontal rows 3 and 4 form the number group 40–49. The number groups 90–99, 140–149 are similarly formed and so on.

The vertical contact rows are operated by lifting means which are operated upon the operation of the bridge magnet allowing during its operation according to the principle of the code relay selector that the selected contacts are closed by spring force. Only two of the lifting means can move and these can freely pass through recesses arranged in a number of parallel strip-shaped code bars L. By displacing appropriate code bars it will be possible to obtain aligned slots below two required vertical contact rows so that the input can be connected with a required output. The 6 code bars with their slots are diagrammatically shown in FIG. 3 while the code magnets displacing the code bars in longitudinal direction are not shown. In the position according to FIG. 3 there are aligned slots below the vertical rows 13 and 14. This is the so-called home position of the bridge in which no outgoing connection is found as the contact group designated by a white symbol has no outward connection. After the termination of the conversation the contacts are maintained in closed position by spring force and they can be maintained in this position until the bridge has been operated the next time.

Figure 7:
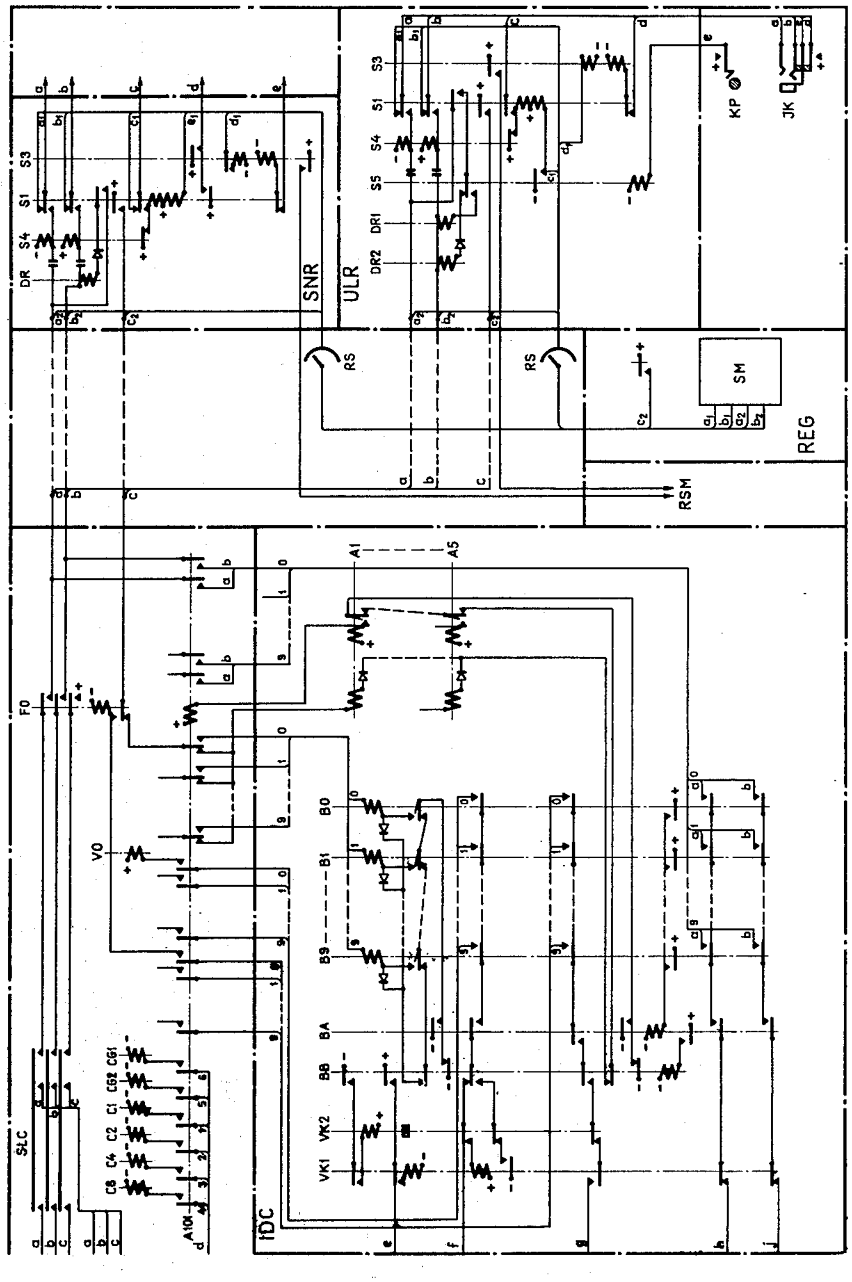

FIGS. 4–7 show a telephone exchange comprising code-relay selectors to which exchange the principle of the invention has been applied in operator traffic. Only such parts are shown which have significance from the point of view of the invention and it is presumed that setting up of a connection from a calling A-subscriber is carried out in usual way through the SLA- and SLB-selectors, the connecting relay set SNR and the GVA- and GVB-selectors until the register through SNR has been connected to the SLC-selector in the subscriber stage of the called subscriber. It should be evident that the setting up process which will be described is the same independently whether the call comes from the same exchange, or from the outside. Register REG, which in FIG. 7 is shown diagrammatically, will send the remaining digit signals which are necessary for enabling the marker SLM to set up a free path from the input of the SLC-stage (FIG. 7) to the called subscriber. A connecting relay set SNR and an operator equipment ULR are shown in FIG. 7 for explaining the function of the circuit arrangement when calling from a subscriber and when calling from an operator. At first a call from a subscriber will be described and then the differences between such call and a call carried out by an operator.

Connecting relay set SNR is occupied by means of plus voltage from the SL-marker of the calling subscriber, whereupon the relay S3 in relay set SNR operates and calls register REG by connecting plus to the latter. Register REG receives the digit signals from the subscriber and sends as much digit information to the GV-stage as is sufficient to set up a free connecting path through the GV-stage to the input of the SLC-stage (FIG. 7). The GV-stage is not shown as it is not important for the understanding the invention but it is supposed that the connection is already at the input of an SLC-bridge which is permanently connected to an incoming line. This implies that the test wire of the incoming line is plus-marked. The identifier of the SLC-stage which is a usual one-wire identifier is called. There are 50 incoming lines to the SLC-stage as appears from FIG. 2 and consequently there are five relays A1–A5 corresponding to 5 horizontal wires and 10 relays B0–B9 corresponding to 10 vertical wires in the identifier. At first operates one of the A-relays, for example A1, in the case the input 1 is called. Then, after the relay A1 has operated A101 operates which is held in operated condition and switches the current paths to the B-relays. One of the B-relays corresponding to the calling line, in the present case B0, operates whereby the line will be identified. The identifier connects the *a*- and *b*-wires of the incoming line to a code receiver KMS (FIG. 6) which receives digit signals from the register and sends answer signals to the register. The signalling between the register and KMS can be carried out by means of any suitable signalling system. According to the illustrated embodiment it is supposed that voice frequency signalling is used. Voice frequency signalling between a sending and a receiving device in a telephone system is known so that no explanation of said principle is necessary. As shown diagrammatically code receiver KMS comprises a voice frequency receiving part TM, which through a filter F1 and an amplifier FF1 obtains digit signals with 2 of 5 frequencies, whereby 2 of 5 voice-frequency sensitive relays are actuated and said relays in turn cause operation of two relays out of five for each digit. For the units the relays NU0, 1, 2, 4, 7 are influenced, for the tens the relays ND0, 1, 2, 4, 7 and for the hundreds the relays NS0, 1, 2, 4, 7. To explain the function of the code receiver more in detail it is supposed that the subscriber having number 025 is called. At first the digit 0 is sent, in consequence of which the relays NU4 and NU7 operate. These relays obtain plus voltage through the wires coming from the voice frequency receiver TM and minus voltage from the break contact of the BG-relay. By the operation of the relays NU4 and NU7 current paths are completed to the relays NS4 and NS7 by means of plus through contacts of the relays NU4 and NU7 and through break contacts of the relays T1 and T2. The relays NS4 and NS7 hold themselves by means of plus voltage from a make contact of the relay BB, which has operated in the identifier IDC.

When the relays NS in code receiver KMS have operated they will contact plus voltage to the relay BP which operates and is maintained operated by a holding winding by means of plus voltage from the voice frequency receiver as long as voice frequency sending for the first digit continues. The relay BP connects the frequencies *f2* and *f3* from the voice frequency sender to the filter F2 for signalling to the register that the first digit has been received. The relay BG operates secondarily to BP. After receiving the answering signal, the register stops the sending of the first digit, whereupon the relays NU and the relay BP release and the current path 1 is connected from the contacts of the relays NS to the relay T1 so that the latter operates and switches the incoming 5 wires to the relays ND0–7. When the relay T1 has operated, the relay BG releases so that KMS can receive the second digit. The second digit was 2 which implies that the relays NU2 and NU0 operate and complete corresponding current paths to the relays ND2 and ND0.

The same sequence is then repeated as after the first digit. Plus polarity is connected through the contacts of the two operated ND-relays and through make contact of the relay T1 to the relay BP which operates and holds itself by means of plus from the voice frequency relays in the voice frequency receiver through the windings of the relays NU as long as the signal is coming in. By operation of the relay BP an answering signal is sent to the register indicating that the second digit has been received. The answering signal now as in the preceding case consists of the frequencies $f2$ and $f3$. After receiving the answering signal the register stops to send the second digit. Secondarily to the relay BP, the relay BG operates as in the preceeding case. When the signal from register REG ceases, the relay BP releases, whereupon contacts of the operated ND-relays connect plus voltage through a make contact of T1 and a make contact of BG to the relay T2 which operates and interrupts the current paths to the relays ND which however are maintained operated through their own contacts.

When relay T2 has operated, the relay BG releases and KMS can receive the third digit. Two of the relays NU, according to the embodiment NU1 and NU4, operate as before, corresponding to the digit 5. AKM operates through make contacts of the relays NU and T2, and through the contacts of the relays NS4 and NS7 a current path will be completed from the contact of AKM corresponding to the digit 0, to the identifier IDS (FIG. 4) in which the relay S1 operates and prepares current paths for those selectors, through which the subscribers having number 0–99 can be reached. According to the grouping plan said selectors are SLA1 and SLA2. The relay S1 maintains itself operated from the contact of AKM.

The relays ND2 and DN0 (FIG. 6) complete the current path corresponding to the ten-digit 2 from plus voltage through the contact of the relay AKM to IDS. This implies that the relay A3 in the identifier operates, and according to the embodiment identifies the third row in the first selector. This is easy to understand when considering that there are altogether 80 A-relays corresponding to the 4 horizontal rows in each of the 20 selectors (FIG. 3). The number of the B-relays is 13 and they represent the 13 vertical contact rows in the SLA-selectors. Two horizontal rows in each selector comprise 13 outputs, while two horizontal rows comprise 12 outputs so that it will not be always possible to determine the A-relay in question by means of only the second digit but in the case of certain numbers it is necessary to use also the last digit for determining the A-relay. As it appears from the grouping of the contacts in FIG. 3 it is possible to determine the A-relays in a selector belonging to the 40 outputs which begin by 0, 1, 2, 3 while the 10 outputs beginning by 4 can be divided over all the four rows, for which reason it is necessary also to know the unit in order to determine the horizontal row. As the subscribers in a hundred group are divided upon two selectors, in one of the selectors the ten value 4 and in the other selector the ten value 9 will not be sufficient for determinig the A-relay but the relay must be dependent on the operation of the unit relays. The current paths are formed correspondingly and as appears from FIG. 6, the current paths 0–3 and 5–8 obtain current directly from the contact of the relay AKM, while the current paths 4 and 9 are determined also by means of the unit digits. It is however easy to ascertain from the circuit diagram how said current paths are determined after operation of the unit relays and this does not make any explanation necessary as it has no importance in respect to the invention. Secondarily for each A-relay (FIG. 4) a secondary relay operates, according to the embodiment the relay A103.

Figure 5:
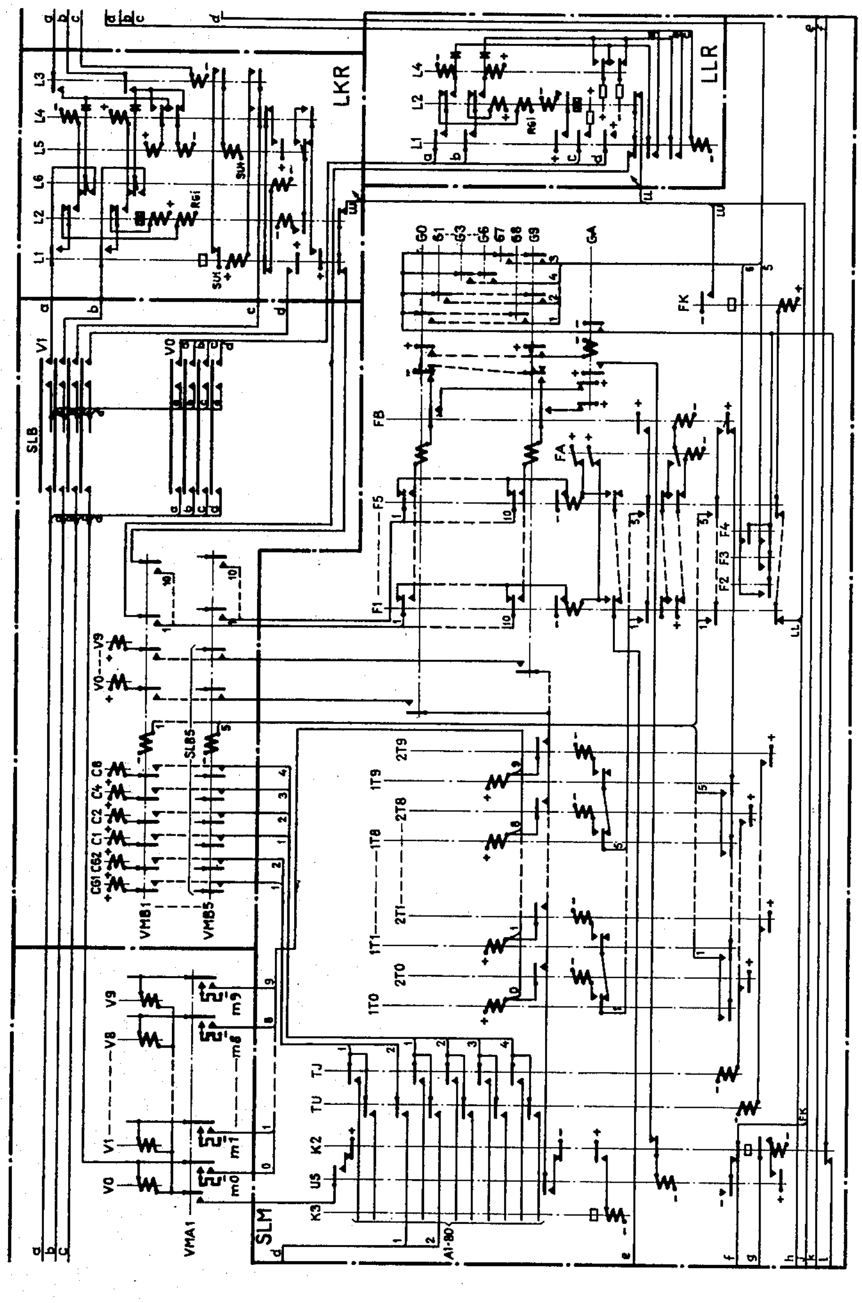
Figure 6:
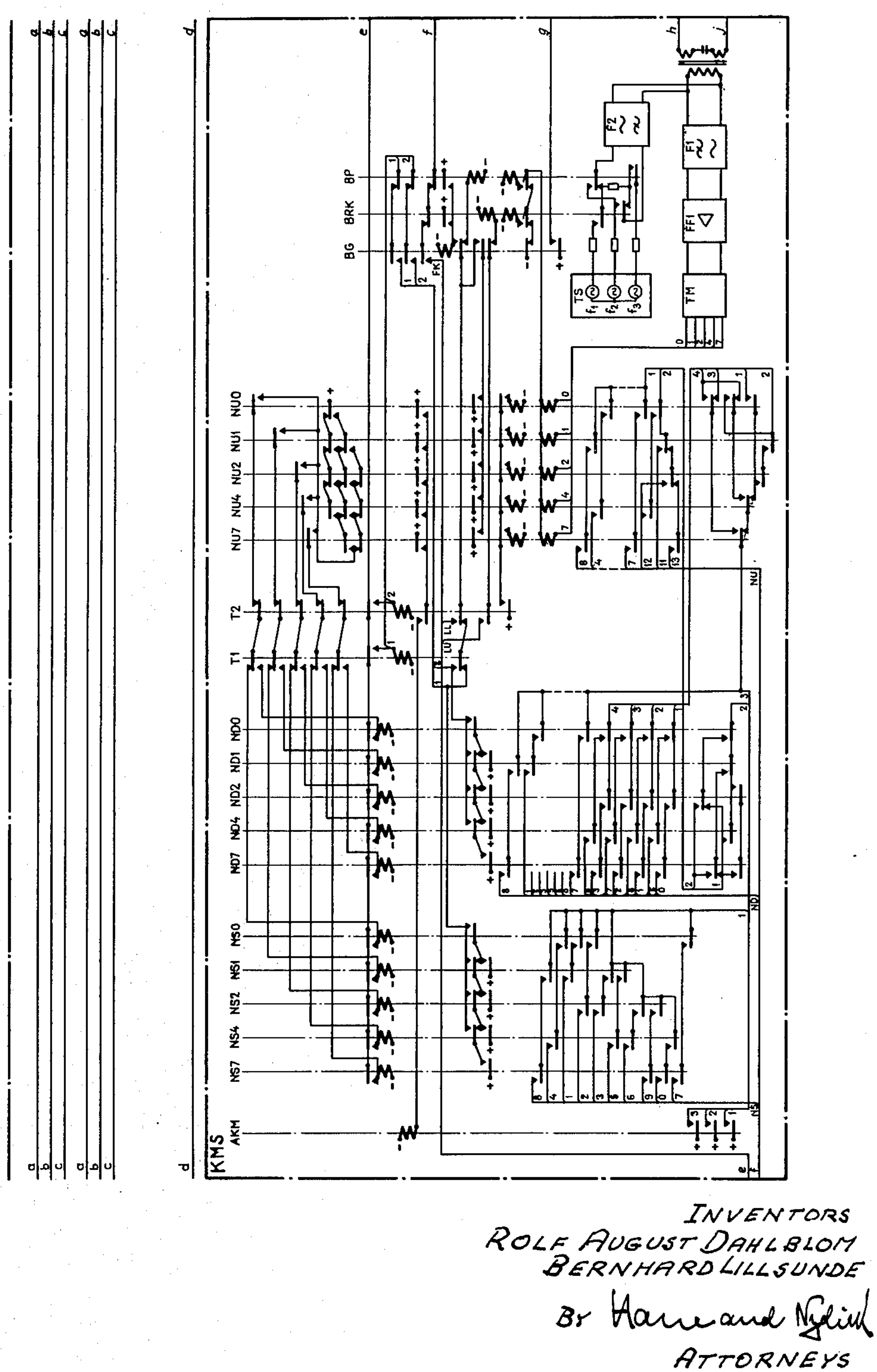

The relays NU (FIG. 6) complete one of the current paths 1–13 in order to operate one of the relays B1–B13 (FIG. 4), according to the embodiment B5 which defines the vertical contact row in the respective selector. By operation of a relay A and a relay B the called subscriber is identified. As mentioned before it has been supposed that the 1000 subscribers in the exchange are divided upon 20 selectors in which each bridge has 50 outputs and the contacts of each subscriber are multiplied over 10 bridges. By operation of one of the 80 A-relays it is determined consequently through which of the selectors the connection has to be set up. Through a contact of the operated relay A3 the connecting relay, for example VMA1 (FIG. 4) will operate, as according to the embodiment the subscriber is located in the selector SLA1. The connecting relay VMA1 connects the test wires of the bridges in the SLA1-selector to test relays 1T0–1T9 in the marker SLM (FIG. 5). The busy bridges have plus polarity on the test wires so that the test relays cannot operate, while the test wires of the idle bridges have no potential, so that the test relays can operate through the resistances $m0$–$m9$. Secondarily to the operation of the relays A and B the relay BA in identifier IDS (FIG. 4) will release and connect plus polarity to a current path extending to the relay TK1 in SLM through a break contact of the relay BB during the operation time of the latter. Thus the relay TK1 operates a short time and connects a current path to the relay LL which consequently operates by means of minus potential obtained through the relay BR and through contacts of the relays A and B and connects minus to the direct connecting relay sets LLR (FIG. 5) which are used for setting up the connection if the subscriber is idle. The relay LL connects plus polarity to the line LL and through a make contact of T2 to the relay BP (FIG. 6) which operates and connects to register REG an answering signal consisting of the frequencies $f2$ and $f3$. The relay BG which has operated secondarily to relay BP holds itself through its own contact from the relay LL in order to prevent that disturbing signals come in. The join-in or cut-in relay sets LKR (FIG. 5) are used when the subscriber is busy and busy-signalling or joining in of the operators can be necessary and they will be described later. To the input of each SLB-bridge is connected a LLR- or LKR-relay set as mentioned before. At first one or more of the relays F1–F5 operate corresponding to the SLB-selectors which have idle bridges with LLR-relay sets belonging to them. One of the F-relays is selected among several F-relays when the relay FA releases. Secondarily operates the relay FB which connects the test wires of the bridge inputs and the LLR-relay sets respectively belonging to the selected SLB-selector, to 10 test relays G0–G9. All the G-relays belonging to idle LLR-relay sets connected to idle bridges in the selected selector operate and one G-relay is selected among the several G-relays. In this manner the LLR-relay set and the SLB-bridge are determined and an operating current path is prepared for the bridge magnet. The relays G and F determine also the output in the SLC-selector and prepare current paths for the operation of the code magnets in SLC (FIG. 7).

By means of plus potential from the make contact of the relay FB one of the two secondary test relays operates, for example relays 2T1 or 2T2 (FIG. 5) belonging to the two SLA-bridges which can cooperate with a definite SLB-bridge according to the grouping plan. The relays A and B in the identifier determine the operating paths for the code magnets in the SLA-selector by means of minus potential from the make contact of the relay GA (FIG. 5). By means of the same minus potential is carried out the operation of the code magnets of SLC and of SLB, said paths being dependent on the selected A-relays, and on the fact whether the SLA-bridge is located in an odd or even vertical row according to the grouping plan. The respective row is marked by the fact that the relays TJ or TU (FIG. 5) operate depending upon which one of the two relays 2T belonging to the same SLB-bridge has been selected. Now the code magnets in all the three selector stages operate.

The operation of the bridges in the SLA- and SLB-selectors is carried out by means of the relay US (FIG. 5) which operates by means of plus potential from a make contact of the relay GA and completes a current path through a contact of the relay VMA of the selector SLA, the bridge magnet of the selected SLA-bridge, again through a contact of the relay VMA, the winding of a relay 1T, a make contact of a relay 2T, a make contact of the relay US and to minus potential through a break contact of the relay K2. Operation of the SLC-bridge is carried out by means of the relay VK1 (FIG. 7) which operates by means of minus potential through a make contact of the relay US, the current path FK, and a make contact of the relay BG in KMS and through contacts of the operated relays BB, BA and G connects minus polarity to the bridge magnet. The relay VK2 operates secondarily to relay VK1 and interrupts the current path to the bridge magnet so that now also the SLC-bridge is in set up state. Furthermore the relay VK1 connects plus polarity from a contact of the relay BG to the busy relay F0 of the SLC-bridge which relay operates and holds itself through its own contact with plus on the test wire of the incoming line and interrupts the test wire towards the IDC-identifier, whereupon IDC, KMS and SLM will be released. The relay F0 (FIG. 7) connects plus to the *c*-wire in forward direction, in consequence of which the busy relay L1 in the selected LLR-relay set (FIG. 5) operates and interrupts the test wire of the relay set LLR to the SKM-marker as a sign that the relay set is busy. Relay L1 connects plus polarity in forward direction to the *c*-wire through the SLA- and SLB-selectors, so that the relay BR (FIG. 4) operates. Furthermore relay L1 connects plus polarity to the *d*-wire in forward direction in order to mark that the SLB-bridge and the SLA-bridge are busy and it connects the *a*- and *b*-wires to the called subscriber. In this way the ring trip relay L2 is connected to the subscriber loop. When the subscriber has answered, the relay L2 will operate, whereby the called subscriber will be connected to the current supply relay L4 and the connection has been set up.

In the case the called subscriber is busy, his *c*-wire is plus potential marked, and when the relay TK1 (FIG. 4) connects the *c*-wire through the contacts of the A- and B-relays to the relay LL, this cannot operate. The relay TK2 operates secondarily to relay TK1 but it releases after relay TK1, has released and it connects after release of relay TK2 a current path from the *c*-wire to the relay LU. The relay LU connects minus potential through all the idle LKR-relay sets (FIG. 5) to the identifier of the SLB-stage and a LKR-relay set is selected by breaking out, whereupon a G-relay and an F-relay operate. This indicates that, similarly to the previously described case, a current path is prepared for operation of the SLB-bridge, with the input of which the LKR-relay set cooperates. The operation of the relay LU completes furthermore a current path through a make contact of the relay T2, to the relay BRK in KMS (FIG. 6) so that said relay operates and connects the frequencies *f*1 and *f*2 to the line as an indication that the called subscriber is busy, whereupon the relay BG is maintained operated as in the preceding case. Operation of the bridges in the SLA- and SLB-stages is carried out by means of the relay US by means of plus potential from a make contact of the relay GB through the prepared current paths, exactly as in the previously described case. The relay BRK releases when the sending of signals from REG ceases. Operating current is connected to the SLC-bridge in the same manner as before. Now the connection is ready from the calling subscriber to the LKR relay set. The relay L3 in set LKR has operated by means of plus potential on the *c*-wire from a make contact of the relay F0 so that the calling subscriber is connected to the winding of the relay L5 in LKR, from which he receives busy signal.

In the case the call is carried out from an operator equipment, the join-in relay set LKR allows the operator to cut into a conversation. A call from the operator equipment ULR (FIG. 7) is carried out in usual manner. By connecting her handset to the jack JK, the operator connects plus polarity through the *d*-wire to the relay S3, which calls the register. (For the sake of simplicity it is supposed that the operator uses the same register as the subscribers.) The register sends the stored digits and the setting up is carried out in the manner previously described. When the digit signals have been sent, the register connects minus polarity to the relay S1 in ULR, whereby the speech current path of the operator is connected to the line.

When the called subscriber is idle, the setting up is carried out through an LLR-relay set exactly in the same way as when calling from a subscriber. If the subscriber is busy, the relay LL (FIG. 4) cannot operate as in the previously described case, when the call is coming from a subscriber. The relay TK2 in SLM remains operative a certain time after the relay TK1 has released as it is slow-releasing and during its release time it connects the current path from the *c*-wire of the subscriber to the relay TB. The relay TB is dimensioned in such manner that if two relay sets already are connected to the called subscriber, which is the case when a busy subscriber has been called by an operator, the relay TB can operate as it obtains plus polarity through two parallel resistances. In this way the relay TB connects minus polarity to the relay VK1, upon which the relay F0 operates, the identifier IDC releases and the operator will be disconnected.

In the case the called subscriber is busy and the relay TB obtains polarity only through the relay set LLR used in the conversation which is the most usual case, the relay TB cannot operate and after the releasing of the relay TK2 the relay LU obtains plus polarity through the *c*-wire of the busy subscriber as mentioned before in the description of a call from a subscriber. When the operator obtains busy signal from the cut-in relay set LKR, she presses the button KP and connects hereby plus to the relay S5 in ULR (FIG. 7). The relay S5 completes a current path through a choke DR so that the relay L5 in LKR (FIG. 5) will operate. Secondarily to the relay L5 the relay L6 operates and connects the speech wires of the operator to the conversation in progress, so that the operator can ask the subscribers to put down their hand sets. As soon as the called subscriber has put down his handset, the relay L1 in LKR will operate by means of minus through the cut-off relay BR of the subscriber and will connect the speech wires of the subscriber to the ring trip relay L2. L6 releases as L1 operates. A ring signal is sent out and when the subscriber lifts his handset, the relay L2 will operate and will connect the subscriber to the current feeding relay L4 in LKR, whereby the connection has been set up between the operator and the subscriber.

As it appears from the drawing the direct connecting relay sets LLR are more simple than the cut-in relay sets LKR as in the present embodiment they comprise 3 relays in comparison with the 6 relays necessary for the cutting in of the operator. When supposing that for example 90% of the connecting relay sets can be of the simpler type, this results in a saving of 270 relays relatively to the use of 100 relay sets of the usual type.

The cut-in relay sets can be used for normal subscriber connections, in the case all the LLR-relay sets are busy. In the SLM-marker (FIG. 5) is arranged a slow-operating relay FK which is connected to minus through a make contact of the relay LL and through contacts of the relays F in SLM. If after a definite time some of the relays F do not operate, which indicates that no idle relay set LLR has been found, the slow-operating relay FK operates and connects operating minus potential to the identifier of the SLB-bridges through the idle LKR-relay sets, one of said relay sets being selected.

The invention is not limited to the embodiment described and it should be clear that the invention is also suitable for a telephone system comprising for example usual cross bar selector or selectors of any suitable type which are set up by means of the marker. It is also evident that the invention can be applied for example to a control desk or other preferential starting point or, as mentioned earlier, to connect a calling subscriber to a subscriber which has been busy before, without departing from the scope of the invention.

We claim:

1. An automatic telephone exchange comprising a plurality of selecting stages consisting of selectors for establishing a connecting path from a calling subscriber line to a called subscriber line, one idle selector being included in each stage, a plurality of connecting relay sets one of which is included in each connecting path for connecting the called subscriber line to said connecting path and for sending signals responsive to the condition of the called subscriber line, a marker having means for setting up a connecting path through idle selectors and through an idle connecting relay set, means for selecting an idle selector in each stage and an idle connecting relay set, and means for testing the condition of the line of the called subscriber to determine whether the connection can be set up, said connecting relay sets being of at least two different types, a plurality of one type having means for setting up a connection to an idle subscriber line, and a plurality of another type having means for sending a busy signal in a revertive direction when a connection cannot be set up and further means for setting up a connection to an idle subscriber line, an input stage having an incoming line connected thereto and said connecting relay sets connected to output thereof, the marker including means for selecting one of said two types of connecting relay sets in response to the tested idle and busy condition respectively of the called subscriber line, and means for setting up a connection through an input stage connected to a connecting relay set of the type which is selected depending on the tested idle and busy condition respectively of the called subscriber line and through an intermediate stage having its input connected to a connecting relay set.

2. An automatic telephone exchange according to claim 1, wherein said other connecting relay sets include means for connecting a calling party to a busy connection.

3. An automatic telephone exchange according to claim 1, wherein the number of said other connecting relay sets is limited to a preselected number of the probable busy calls.

4. An automatic telephone exchange comprising a plurality of selecting stages including selectors for establishing a connecting path from a calling subscriber line to a called subscriber line, one idle selector being included in each stage, a plurality of connecting relay sets one of which is included in each connecting path for connecting the called subscriber line to said connecting path and for sending signals responsive to the condition of the called subscriber line, a marker having means for setting up a connecting path through idle selectors and through an idle connecting relay set, means for selecting an idle selector in each stage and an idle connecting relay set, means for testing the condition of the line of the called subscriber to determine whether the connection can be set up, said connecting relay sets being of at least two different types, a plurality of one type having means for setting up a connection to an idle subscriber line, and a plurality of another type having means for sending a busy signal in a revertive direction when a connection cannot be set up and further means for setting up a connection to an idle subscriber line, an input stage having an incoming line connected thereto and said connecting relay sets connected to outputs thereof, said marker including means for selecting one of said other connecting relay sets when said one type of connecting relay sets are busy, and means for setting up a connection through an input stage connected to a connecting relay set of the type which is selected and through an intermediate stage having its input connected to the selected connecting relay set.

References Cited by the Examiner

UNITED STATES PATENTS

| | | | |
|---|---|---|---|
| 1,925,681 | 9/1933 | Uda | 179—18 |
| 2,151,767 | 3/1935 | Hovland | 179—27 |
| 2,621,257 | 12/1952 | Voss et al. | 179—27 |
| 2,717,923 | 9/1955 | Pharis | 179—18 |
| 2,792,453 | 5/1957 | Spiecker | 179—27 |

ROBERT H. ROSE, *Primary Examiner.*

WALTER L. LYNDE, *Examiner.*